United States Patent
Nishida et al.

(10) Patent No.: US 9,254,569 B2
(45) Date of Patent: Feb. 9, 2016

(54) TRAJECTORY CONTROL DEVICE AND CONTROL METHOD FOR ARTICULATED ROBOT

(71) Applicant: Kobe Steel, Ltd., Hyogo (JP)

(72) Inventors: Yoshiharu Nishida, Kobe (JP); Takashi Wada, Kobe (JP); Yoshihide Inoue, Fujisawa (JP); Shuichi Inada, Fujisawa (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 14/403,311

(22) PCT Filed: May 30, 2013

(86) PCT No.: PCT/JP2013/065054
§ 371 (c)(1),
(2) Date: Nov. 24, 2014

(87) PCT Pub. No.: WO2013/180222
PCT Pub. Date: Dec. 5, 2013

(65) Prior Publication Data
US 2015/0112484 A1    Apr. 23, 2015

(30) Foreign Application Priority Data

May 30, 2012    (JP) ................................ 2012-123240

(51) Int. Cl.
*B25J 9/00* (2006.01)
*B25J 9/16* (2006.01)
(Continued)

(52) U.S. Cl.
CPC ............... *B25J 9/163* (2013.01); *B23K 9/0216* (2013.01); *B23K 9/173* (2013.01); *B25J 9/06* (2013.01);
(Continued)

(58) Field of Classification Search
CPC combination set(s) only.
See application file for complete search history.

(56) References Cited

U.S. PATENT DOCUMENTS 4,786,847 A * 11/1988 Daggett ................. B25J 9/1633
318/568.2
4,937,759 A *  6/1990 Vold ....................... B25J 9/1602
700/262

(Continued)

FOREIGN PATENT DOCUMENTS

JP    H03-40008 A     2/1991
JP    H06-250723 A    9/1994

(Continued)

OTHER PUBLICATIONS

International Search Report; PCT/JP2013/065054; Aug. 27, 2013.

(Continued)

*Primary Examiner* — Jonathan L Sample
(74) *Attorney, Agent, or Firm* — Studebaker & Brackett PC

(57) ABSTRACT

In a trajectory control device (10) for an articulated robot, a first dynamic characteristic calculation unit (300) is provided with a high-frequency cutoff characteristic having a cutoff frequency which is lower than the natural oscillation frequency of the robot, performs filtering processing with respect to a joint-angle command value (θc), and outputs a processed joint-angle target value (θd). A second dynamic characteristic calculation unit (400) is provided with a high-frequency cutoff characteristic having a cutoff frequency which is lower than that of the first dynamic characteristic calculation unit (300), performs filtering processing with respect to the output from a coupling-torque compensation command value calculation unit (200), and outputs a processed coupling-torque compensation value (cd).

7 Claims, 8 Drawing Sheets

(51) Int. Cl.
  *G05B 19/4093* (2006.01)
  *B23K 9/02* (2006.01)
  *B25J 9/06* (2006.01)
  *B23K 9/173* (2006.01)

(52) U.S. Cl.
  CPC .......... *B25J 9/1633* (2013.01); *G05B 19/4093* (2013.01); *G05B 2219/41166* (2013.01); *G05B 2219/45104* (2013.01); *G05B 2219/49384* (2013.01); *Y10S 901/02* (2013.01)

(56) References Cited

U.S. PATENT DOCUMENTS

| | | | | |
|---|---|---|---|---|
| 4,975,856 A * | 12/1990 | Vold | ............. | B25J 9/1602 318/568.19 |
| 4,999,553 A * | 3/1991 | Seraji | ............. | B25J 9/1643 318/628 |
| 5,155,423 A * | 10/1992 | Karlen | ............. | B25J 9/04 318/568.1 |
| 5,179,514 A * | 1/1993 | Rastegar | ............. | G05B 19/19 318/568.18 |
| 5,648,709 A * | 7/1997 | Maeda | ............. | G05B 17/02 318/568.1 |
| 7,684,896 B2 * | 3/2010 | Dariush | ............. | A61B 5/1038 318/560 |
| 2003/0125839 A1 * | 7/2003 | Takenaka | ............. | B62D 57/02 700/245 |
| 2007/0200525 A1 * | 8/2007 | Kanaoka | ............. | G05D 1/0875 318/568.21 |
| 2007/0255454 A1 * | 11/2007 | Dariush | ............. | G06N 3/008 700/245 |
| 2007/0299427 A1 * | 12/2007 | Yeung | ............. | A61B 19/2203 606/1 |
| 2009/0105880 A1 * | 4/2009 | Okazaki | ............. | B25J 9/1633 700/258 |
| 2009/0163929 A1 * | 6/2009 | Yeung | ............. | A61B 19/2203 606/130 |
| 2010/0168919 A1 * | 7/2010 | Okamoto | ............. | B25J 9/1643 700/275 |
| 2012/0072026 A1 * | 3/2012 | Takagi | ............. | B25J 9/1075 700/261 |
| 2012/0158179 A1 * | 6/2012 | Ooga | ............. | B25J 9/1633 700/259 |
| 2015/0105905 A1 * | 4/2015 | Nishida | ............. | B25J 9/1641 700/254 |
| 2015/0112484 A1 * | 4/2015 | Nishida | ............. | G05B 19/4093 700/254 |

FOREIGN PATENT DOCUMENTS

| | | |
|---|---|---|
| JP | H10-217173 A | 8/1998 |
| JP | H11-73211 A | 3/1999 |
| JP | H11-134012 A | 5/1999 |

OTHER PUBLICATIONS

Written Opinion of the International Searching Authority; PCT/JP2013/065054; Aug. 27, 2013.

* cited by examiner

TRAJECTORY CONTROL DEVICE AND CONTROL METHOD FOR ARTICULATED ROBOT

TECHNICAL FIELD

The present invention relates to control of an articulated robot for use in, for example, arc welding, and more particularly, to trajectory control for an articulated robot that allows weaving motion with high trajectory accuracy.

BACKGROUND ART

When a plurality of base materials are welded by arc welding, weaving welding is adopted in which welding is performed while advancing a welding electrode in the welding direction and weaving the welding electrode in a sinusoidal form in the right-left direction along a welding line. This weaving welding has hitherto been performed by swinging a welding torch itself in the right and left directions or tilting the welding electrode about the welding torch itself in the right and left directions. When such weaving welding is performed by an articulated robot, high trajectory accuracy is required.

In such an articulated robot, servo control is performed at each axis. However, since the natural frequency is low, for example, velocity feedforward control is rarely applied from the viewpoint of suppression of oscillation. Therefore, the phase delay of the actual feedback value with respect to the target value is large, and the response characteristic of a velocity controller in a servo control unit differs among the axes. This leads to a trajectory error. Since the position and velocity control characteristics (especially the phase delay characteristic) of the servo control unit change with the change in inertia resulting from the change in posture of the robot, nonlinear compensation control, which calculates, for example, the coupling torque between axes backward from the target value and makes compensation, has rarely effectively functioned owing to the phase shift. The following techniques are known for such trajectory control for the articulated robot.

Japanese Unexamined Patent Application Publication No. 10-217173 (PTL 1) discloses a decoupling controller for a multiaxis robot, which can obtain stable trajectory accuracy. This decoupling controller for the robot is provided in a multiaxis robot control device that controls a robot having a structure in which at least two arms are serially coupled via joints. This decoupling controller for the robot includes an inertial-matrix calculating mechanism that forms an inertial matrix from the angle of each arm and dynamic parameters such as mass and length of each arm, a computing mechanism that calculates decoupling condition variables including acceleration of each arm, and a computing mechanism that calculates decoupling gain to be multiplied by these condition variables. The decoupling controller further includes a multiplier and an adder that subject the decoupling condition variables and the decoupling gain to multiplication and addition, and a filter processor that eliminates higher harmonic ripples from a decoupling torque command obtained by these calculations.

Japanese Examined Patent Application Publication No. 8-7625 (PTL 2) discloses a position controller that enhances followability of a system to a trajectory command. This position controller includes one axis or a plurality of axes, and the axes are controlled by position feedback control. Herein, in addition to a position feedback loop, a feedforward loop is provided. In the feedforward loop, a position command is on the input side, a differentiation element having feedforward gain and an idle time element are provided in series, and velocity feedforward compensation output is added after position loop gain of the position feedback loop.

CITATION LIST

Patent Literature

PTL 1: Japanese Unexamined Patent Application Publication No. 10-217173
PTL 2: Japanese Examined Patent Application Publication No. 8-7625 (Japanese Unexamined Patent Application Publication No. 3-40008)

SUMMARY OF INVENTION

Technical Problem

PTL 1 described above discloses the technique of decoupling the axes. However, this technique needs a first-order differential value and a second-order differential value of the arm acceleration, and is highly susceptible to noise. Further, realization of the technique is considerably restricted. That is, for example, even when there is a slightly steep operation, the second-order differential value of the arm acceleration shows an astronomical value.

PTL 2 discloses the technique of increasing the feedforward gain without exciting natural oscillation of the robot by subjecting the velocity feedforward value to filtering processing. However, the increase in feedforward gain made by this technique is insignificant, and therefore, the technique does not reach a fundamental solution. Further, this technique does not cope with the difference in control characteristics between the axes and the change in control characteristics in accordance with the posture. Still further, since the differential value of the target position and the filter-processed velocity feedforward value are different in phase, it is difficult to realize desired control characteristics.

That is, the related arts do not solve the following problems.

(1) Since nonlinear compensation control for decoupling the axes cannot be effectively performed in a state in which the natural frequency of the robot is low, the influence of the coupling torque between the axes cannot be compensated. This leads to accuracy deterioration.

(2) Since nonlinear compensation control for decoupling the axes cannot be effectively performed in a state in which there is a phase delay in the servo control unit, the influence of the coupling torque between the axes cannot be compensated. This leads to accuracy deterioration.

(3) Since the servo control characteristic differs among the axes, there are differences in response among the axes. This leads to accuracy deterioration.

(4) The change in servo control characteristic in accordance with the posture of the robot leads to deterioration of trajectory accuracy.

(5) In the weaving motion of the welding robot, it is significantly important that the phase delay and the gain characteristic are equal among the axes in the weaving period. However, it is difficult to make the phase and gain characteristics equal in the high-frequency weaving motion, because of coupling between the axes, the change in servo characteristic according to the posture, and differences in characteristic among the axes.

The present invention has been made in view of the above-described problems, and an object of the invention is to provide a trajectory control device and a control method for an articulated robot, which allow an articulated robot having a plurality of axes to make motion, such as weaving, with high trajectory accuracy by compensating the influence of coupling torque between the axes.

Solution to Problem

To solve the above-described problems, a trajectory control device for an articulated robot according to the present invention takes the following technical means.

That is, a trajectory control device for an articulated robot according to the present invention controls the motion of the articulated robot of driving a plurality of joint axes by a motor attached to the articulated robot so that a tool makes a desired motion. The trajectory control device includes a joint-angle command value calculation unit that calculates and outputs a joint-angle command value $\theta c$ for each of the joint axes to realize the desired motion of the tool, a coupling-torque compensation command value calculation unit that calculates, from the joint-angle command value $\theta c$ according to a dynamics model, a coupling torque interacting between the joint axes when the motion is made according to the joint-angle command value $\theta c$ and outputs an coupling-torque compensation command value cc, a first dynamic characteristic calculation unit having a high-frequency cutoff characteristic with a cutoff frequency lower than a natural oscillation frequency of the robot, the first dynamic characteristic calculation unit subjecting the joint-angle command value $\theta c$ to filtering processing, and outputting a processed joint-angle target value $\theta d$, a joint-angle control unit to which the joint-angle target value $\theta d$ is input as a target value for the motor, a second dynamic characteristic calculation unit having a high-frequency cutoff characteristic with a cutoff frequency lower than or equal to the cutoff frequency of the first dynamic characteristic calculation unit, the second dynamic characteristic calculation unit subjecting at least one of an input to the coupling-torque compensation command value calculation unit and an output from the coupling-torque compensation command value calculation unit to filtering processing, and outputting a processed coupling-torque compensation value cd, and a motor-current control unit to which a value obtained by adding the coupling-torque compensation value cd to a motor-torque command value output from the joint-angle control unit is input as a target value.

Preferably, the trajectory control device can be configured such that a phase delay of the first dynamic characteristic calculation unit in the axis where a response of the joint-angle control unit is slow is shorter than a phase delay of the first dynamic characteristic calculation unit in the axis where a response of the joint-angle control unit is fast.

Further preferably, the trajectory control device can be configured such that a characteristic of the first dynamic characteristic calculation unit is changed in accordance with a posture of the articulated robot.

Further preferably, the trajectory control device can be configured such that a feedback control dynamic characteristic from the joint-angle target value $\theta c$ to an actual joint angle $\theta$ in a state in which there is no coupling between the axes is calculated on the basis of a parameter including at least one of a position feedback gain and a velocity feedback gain, such that the cutoff frequency of the second dynamic characteristic calculation unit is lower than the cutoff frequency of the first dynamic characteristic calculation unit, and such that a characteristic of the first dynamic characteristic calculation unit is given to correspond to a characteristic obtained by dividing a characteristic of the second dynamic characteristic calculation unit by the feedback control dynamic characteristic.

Further preferably, the trajectory control device can be configured such that, when a current control characteristic of the motor-current control unit is considered, the characteristic of the first dynamic characteristic calculation unit is given to correspond to a characteristic obtained by subjecting the characteristic of the second dynamic characteristic calculation unit to division by the feedback control dynamic characteristic and multiplication by the current control characteristic.

A trajectory control method for an articulated robot according to another embodiment of the present invention includes a joint-angle command value calculation step of calculating and outputting a joint-angle command value $\theta c$ for each of joint axes to realize a desired tool motion, interference coupling-torque compensation command value calculation step of calculating, from the joint-angle command value $\theta c$ according to a dynamics model, a coupling torque interacting between the joint axes when the motion is made according to the joint-angle command value $\theta c$ and outputting a coupling-torque compensation command value cc, a first dynamic characteristic calculation step having a high-frequency cutoff characteristic with a cutoff frequency lower than a natural oscillation frequency of the robot, the first dynamic characteristic calculation step subjecting the joint-angle command value $\theta c$ to filtering processing, and outputting a processed joint-angle target value $\theta d$, a joint-angle control step of receiving the joint-angle target value $\theta d$ as a target value for a motor, a second dynamic characteristic calculation step having a high-frequency cutoff characteristic with a cutoff frequency lower than or equal to the cutoff frequency of the first dynamic characteristic calculation unit, the second dynamic characteristic calculation step subjecting at least one of an input to the coupling-torque compensation command value calculation step and an output from the coupling-torque compensation command value calculation step to filtering processing, and outputting a processed coupling-torque compensation value cd, and a motor-current control step of receiving, as a target value, a value obtained by adding the coupling-torque compensation value cd to a motor torque command value output from the joint-angle control step.

Advantageous Effects of Invention

The use of the trajectory control device or control method according to the present invention allows an articulated robot having a plurality of axes to make motion, such as weaving, with high trajectory accuracy while compensating the influence of the coupling torque between the axes.

DESCRIPTION OF EMBODIMENTS

Figure 1:
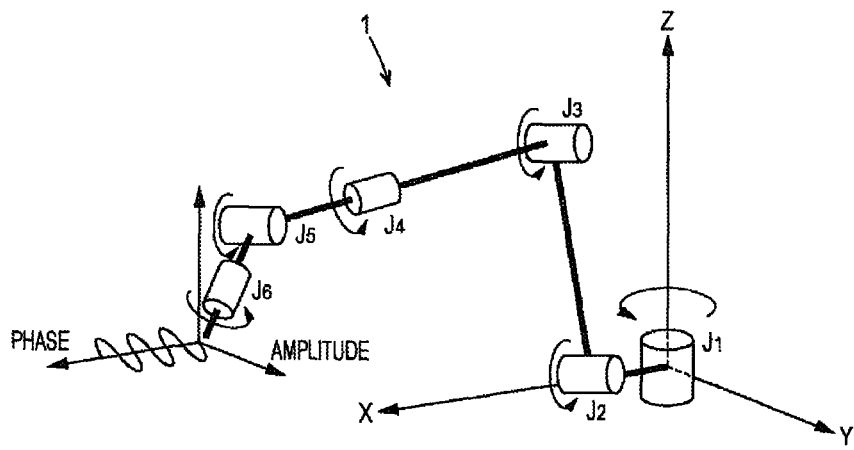
FIG. 1 is a schematic view illustrating the overall configuration of an articulated robot to which a trajectory control device according to an embodiment of the present invention is applied.

A trajectory control device and a control method for an articulated robot according to embodiments of the present invention will be described in detail below with reference to the drawings. In the following description, the same components are denoted by the same reference numerals, and have the same names and functions. Therefore, detailed descriptions thereof are not repeated. While an articulated robot that causes a welding torch to make tilting motion (weaving motion) will be described as a control target below, it is just an example. The trajectory control device according to the present invention can be widely applied to control for driving a plurality of joint axes so that a tool attached to the articulated robot makes a desired motion.

First Embodiment

Overall Configuration

First, a description will be given of the outline of a vertical articulated robot to which a trajectory control device according to an embodiment is applied (hereinafter sometimes simply referred to as an articulated robot).

FIG. 1 schematically illustrates an articulated robot 1 to which the trajectory control device of the embodiment is applied, which is an example of a robot in which a welding torch makes tilting motion (weaving motion). This articulated robot 1 is of a vertical articulated type including six joints J1 to J6, and performs arc welding with a welding wire fed from a welding torch provided at the distal end of an axis of J6. In the articulated robot 1, a section between a welding start point and a welding end point determined beforehand is set as a welding section. The articulated robot 1 is set to make a motion (weaving motion) of tilting the welding wire with predetermined amplitude and at predetermined frequency while moving in the direction of a welding line that connects the welding start point and the welding end point.

In addition to an illustrated body of the articulated robot 1, the articulated robot 1 includes a controller (servo controller) having a teaching pendant and configured to perform servo control on the axes, and a host computer (host CPU). The controller and the host computer realize the trajectory control device of the embodiment.

The controller (servo controller) controls the welding torch provided in the articulated robot 1 so that the welding torch moves while performing weaving motion along the above-described welding line according to a program taught beforehand. The teaching program is sometimes created using the teaching pendant connected to the controller, or is sometimes created using an off-line teaching system utilizing the host computer. In any of the cases, the teaching program is created prior to the actual motion. In the host computer, a weld pass is created, and a weaving motion command based on the weld pass is prepared.

[Control Block]

Figure 2:
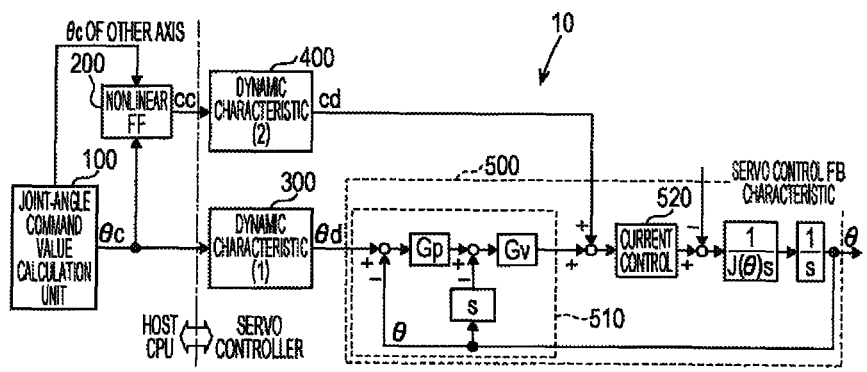
FIG. 2 is a control block diagram of the trajectory control device according to a first embodiment of the present invention.

FIG. 2 is a control block diagram of a trajectory control device 10 that controls the articulated robot 1 illustrated in FIG. 1. As described above, the trajectory control device 10 includes a part realized by the host computer and a part realized by the servo controller.

As illustrated in FIG. 2, the trajectory control device 10 drives a plurality of joint axes so that a tool attached to the articulated robot 1 (here a welding torch) performs a desired motion (here a weaving motion).

The trajectory control device 10 includes a joint-angle command value calculation unit 100 and a coupling-torque compensation command value calculation unit 200 (shown as "NONLINEAR FF"), which are realized by the host computer CPU. The trajectory control device 10 further includes a first dynamic characteristic calculation unit 300 (shown as "DYNAMIC CHARACTERISTIC (1)"), a second dynamic characteristic calculation unit 400 (shown as "DYNAMIC CHARACTERISTIC (2)"), and a feedback control unit 500 (shown as "SERVO CONTROL FB CHARACTERISTIC"), which are realized by the servo controller. The feedback control unit 500 includes a joint-angle control part 510 and a motor-current control part 520 (shown as "CURRENT CONTROL"). In the following, all characteristics of the elements in the control block are dynamic characteristics even when it is not written that the characteristics are dynamic characteristics. Further, "FB" represents feedback, and "FF" represents feedforward.

The joint-angle command value calculation unit 100 calculates and outputs a joint-angle command value θc of each joint axis for realizing the weaving motion of the welding torch.

The coupling-torque compensation command value calculation unit 200 calculates coupling torque, which is generated to interact between the joint axes when the motion is made according to the joint-angle command value θc output from the joint-angle command value calculation unit 100, from the joint-angle command value θc on the basis of a dynamics model. Then, the coupling-torque compensation command value calculation unit 200 outputs a coupling-torque compensation command value cc.

The first dynamic characteristic calculation unit 300 subjects the joint-angle command value θc output from the joint-angle command value calculation unit 100 to filtering processing, and outputs a processed joint-angle target value θd. The first dynamic characteristic calculation unit 300 is provided with a high-frequency cutoff characteristic (low-pass filter) having a cutoff frequency lower than the natural oscillation frequency of the articulated robot 1.

The second dynamic characteristic calculation unit 400 subjects at least one of the input to the coupling-torque compensation command value calculation unit 200 and the output from the coupling-torque compensation command value calculation unit 200 to filtering processing, and outputs a processed coupling-torque compensation value cd. In FIG. 2, the second dynamic characteristic calculation unit 400 subjects the output from the coupling-torque compensation command value calculation unit 200 to filtering processing. The second dynamic characteristic calculation unit 400 is provided with a high-frequency cutoff characteristic (low-pass filter) having a cutoff frequency lower than or equal to that of the first dynamic characteristic calculation unit 300.

The joint-angle control part 510 receives the joint-angle target value θd as a target value for the motor.

The motor-current control part 520 receives, as a target value, a value obtained by adding the coupling-torque compensation value cd output from the second dynamic characteristic calculation unit 400 to a motor-torque command value output from the joint-angle control part 510.

The trajectory control device 10 illustrated in the block diagram of FIG. 2 has the following features.

The second dynamic characteristic calculation unit 400 is disposed before and/or (here only after) the coupling-torque compensation command value calculation unit 200 serving as a nonlinear term. The second dynamic characteristic calculation unit 400 gives the property of cutting off a high-frequency band higher than or equal to the high-frequency cutoff characteristic of the first dynamic characteristic calculation unit 300. Here, the cutoff frequency of the second dynamic characteristic calculation unit 400 is lower than or equal to the cutoff frequency of the first dynamic characteristic calculation unit 300.

According to this structure, the first dynamic characteristic calculation unit 300 can reduce high frequency, containing a natural oscillation component, included in the joint-angle command value θc. Further, the second dynamic characteristic calculation unit 400 can reduce high frequency, containing a natural oscillation component, included in the coupling-torque compensation command value cc. This can suppress high-frequency oscillation occurring in the articulated robot 1.

In the articulated robot 1, even when low-frequency operation is performed in the XYZ plane, if the joint angle changes at a position where the Jacobian steeply changes, for example, near the singular point, a high-frequency component double or three times the joint angle occurs. Further, even when low-frequency operation is performed in the joint-angle space, since the nonlinear term has, for example, a square term of velocity, a high frequency component double or three times the joint angle occurs. For this reason, the coupling-torque compensation command value cc output from the coupling-torque compensation command value calculation unit 200 serving as the nonlinear term is processed into the coupling-torque compensation value cd by the second dynamic characteristic calculation unit 400 having the high-frequency cutoff characteristic higher than or equal to the high-frequency cutoff characteristic of the first dynamic characteristic calculation unit 300. This further suppresses high-frequency oscillation occurring in the articulated robot 1.

[Control Characteristic (Weaving Trajectory)]

A description will be given of the control characteristic (weaving trajectory) when the articulated robot 1 is controlled by the trajectory control device 10 having the above-described configuration.

Figure 3:
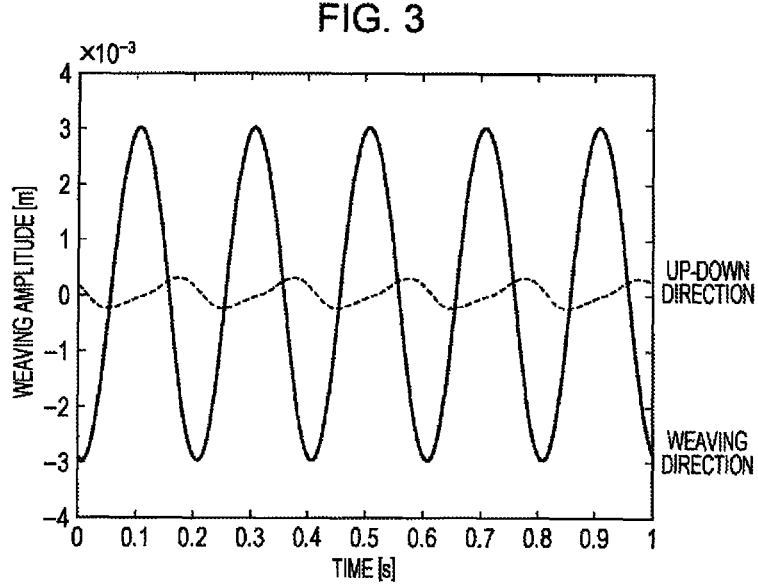
FIG. 3 shows a weaving trajectory of an articulated robot controlled according to the control block diagram of FIG. 2.

FIG. 3 shows a weaving trajectory when a high-frequency cutoff characteristic equal to that of the first dynamic characteristic calculation unit 300 is given as the high-frequency cutoff characteristic of the second dynamic characteristic calculation unit 400.

For evaluation of this, the related art (a control block diagram and a weaving trajectory) will be first described.

Figure 4:
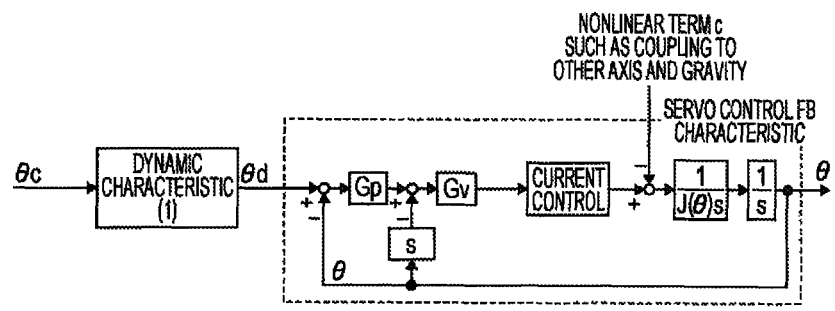
FIG. 4 is a control block diagram of a trajectory control device of the related art.

FIG. 4 is a control block diagram of the most popular articulated robot. As illustrated in FIG. 4, this control block includes a position control unit (Gp), a velocity control unit (GO, and a current control unit. The position control unit performs feedback control on the joint angle, performs proportional control (P-control) on the angular deviation, and gives a velocity command to the velocity control unit. The velocity control unit performs feedback control on the joint angular velocity, performs proportional integral control (PI-control) on a deviation from the given velocity command, and gives a current control command to the current control unit.

The current control unit controls the motor current on the basis of the given current control command.

Since the natural frequency of the machinery of the articulated robot is low, components that excite natural oscillation are reduced by filtering processing, for example, by a dynamic calculation unit (DYNAMIC CHARACTERISTIC 1) illustrated in FIG. 4 so that these components are not included in the target value.

However, in the articulated robot, the coupling torque acts as a nonlinear term c, including, for example, a gravity term, between the axes. Particularly in a weaving motion of the welding robot, considerably accurate dynamic control is necessary because there is a need to swing the welding torch with a desired amplitude in a desired direction without shaking the welding torch upward and downward (without causing movement in the up-down direction). For this reason, the effect of the nonlinear term c is enormous.

Figure 5:
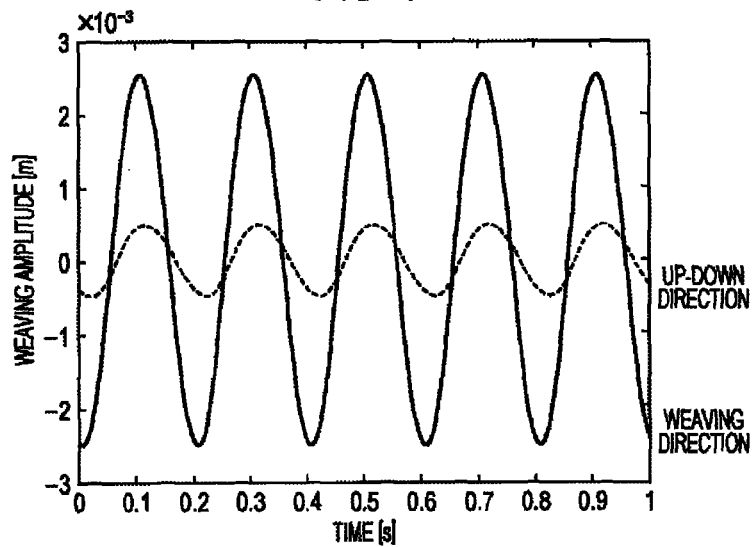
FIG. 5 shows a weaving trajectory of an articulated robot controlled according to the control block diagram of FIG. 4.

FIG. 5 shows a weaving trajectory when the articulated robot is controlled by the control device shown by the control block of FIG. 4. As shown in FIG. 5, when the nonlinear term c acts, movement in the up-down direction occurs, and this is not proper for the weaving motion. To suppress the movement, it is conceivable to calculate the nonlinear term on the target value base and to perform feedforward compensation.

Figure 6:
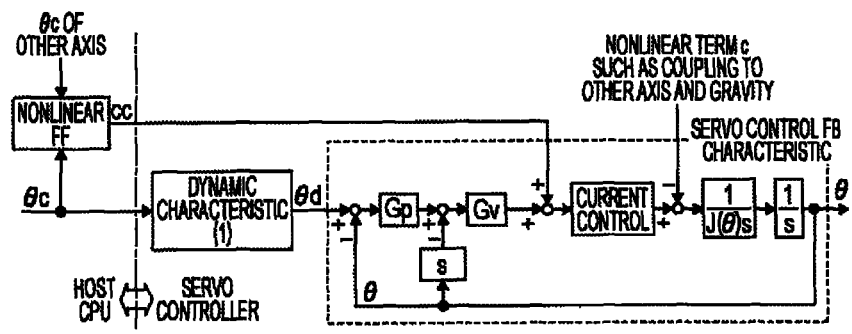
FIG. 6 is a control block diagram of another trajectory control device of the related art.

FIG. 6 is a control block diagram that realizes nonlinear feedforward compensation of the related art on the target value base according to the above conception.

Figure 7:
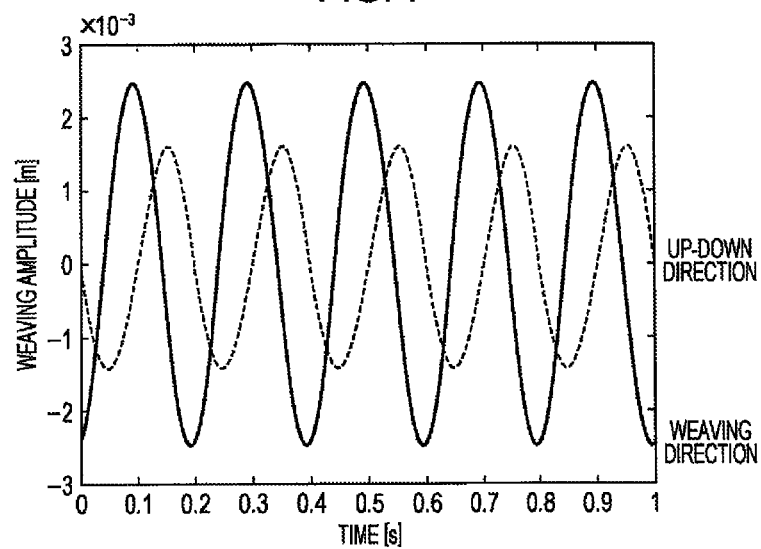
FIG. 7 shows a weaving trajectory of an articulated robot controlled according to the control block diagram of FIG. 6.

FIG. 7 shows a weaving trajectory when the articulated robot is controlled by a control device shown by the control block of FIG. 6. Since this is feedforward compensation on the target value base, the feedforward timing deviates owing to the influence of the phase delay, and this worsens the movement in the up-down direction.

In such control of the related art, in general, the phase characteristic and the gain characteristic in a feedback control unit (servo-control feedback characteristic) differ among the axes. Further, since the inertia matrix changes in accordance with the posture of the robot, the control feedback characteristic changes even at the same axis in accordance with the posture. For this reason, for example, it is difficult to match the phases of feedforward control. Therefore, the above-described feedforward control is not in practical use, and it is difficult to reduce the influence of coupling between the axes.

In FIG. 6, a host CPU performs nonlinear feedforward calculation. Calculation of the nonlinear term is generally performed on the target value base by the host CPU, because the calculation is considerably complicated, the amount of calculation is large, and it is difficult for the servo control unit to perform the calculation.

Compared to FIG. 5 and FIG. 7 showing the results of control (weaving trajectories) according to the related arts, in the result (weaving trajectory) of the trajectory control device 10 of this embodiment, as illustrated in FIG. 3, an up-down moving component occurs, but the up-down moving component is suppressed greatly. FIG. 3 shows the result when the high-frequency cutoff characteristic of the second dynamic characteristic calculation unit 400 is equal to the high-frequency cutoff characteristic of the first dynamic characteristic calculation unit 300.

In the trajectory control device 10 of this embodiment, the first dynamic characteristic calculation unit 300 reduces the high frequency containing the natural oscillation component included in the joint-angle command value θc. Further, the second dynamic characteristic calculation unit 400 reduces the high frequency containing the natural oscillation component included in the coupling-torque compensation command value cc. This suppresses oscillation resulting from the non-linear term in the above-describe related arts.

As described above, the trajectory control device of this embodiment allows the articulated robot to make motion, such as weaving, with high trajectory accuracy while compensating the influence of coupling torque between the axes.

Second Embodiment

A trajectory control device according to a second embodiment of the present invention will be described below. The trajectory control device of this embodiment is different from the above-described trajectory control device 10 of the first embodiment in the way to provide the first dynamic characteristic calculation unit 300. Since others are the same as those of the first embodiment, descriptions overlapping with the above descriptions are not repeated here.

In the above-described first embodiment, the high-frequency cutoff characteristic more than or equal to that of the first dynamic characteristic calculation unit 300 is given to the second dynamic characteristic calculation unit 400. In this embodiment, the second dynamic characteristic calculation unit 400 is provided with a considerably strong high-frequency cutoff characteristic, similarly to the first embodiment. Further, the characteristic of the first dynamic characteristic calculation unit 300 is given as a characteristic obtained by multiplying the dynamic characteristic of the second dynamic characteristic calculation unit 400 by an inverse characteristic of a feedback characteristic estimated under servo control of each axis. This means that the characteristic of the first dynamic characteristic calculation unit 300 is given such as to correspond to a characteristic obtained by dividing the characteristic of the second dynamic characteristic calculation unit 400 by the feedback control dynamic characteristic.

In the case of the control block of FIG. 2, the dynamic characteristic of the servo feedback control of each axis is given by the following Expression (1). In the following expressions, "dynamic characteristic 1" represents the dynamic characteristic of the first dynamic characteristic calculation unit 300, and "dynamic characteristic 2" represents the dynamic characteristic of the second dynamic characteristic calculation unit 400.

[Math. 1]

$$\frac{\text{current control characteristic} \times (Gp \cdot Gv \cdot s + Gp \cdot Gi)}{J \cdot s^3 + \text{current control characteristic} \times (Gv \cdot s^2 + (Gp \cdot Gv + Gi) \cdot s + Gp \cdot Gi)} \quad (1)$$

Therefore, the first dynamic characteristic calculation unit 300 is given by the following Expression (2).

[Math. 2]

$$\text{dynamic characteristic 2/servo } FB \text{ control} \quad (2)$$
$$\text{dynamic characteristic} \times \text{current control characteristic} =$$
$$\text{dynamic characteristic 2} \times \frac{J \cdot s^3 + \text{current control characteristic} \times}{Gp \cdot Gv \cdot s + Gp \cdot Gi}$$

However, it is necessary to give a strong high-frequency cutoff characteristic to the second dynamic characteristic calculation unit 400 so that Expression (2) becomes a proper transfer function (the order of a numerator polynomial is equal to or lower than the order of a denominator polynomial).

Figure 8:
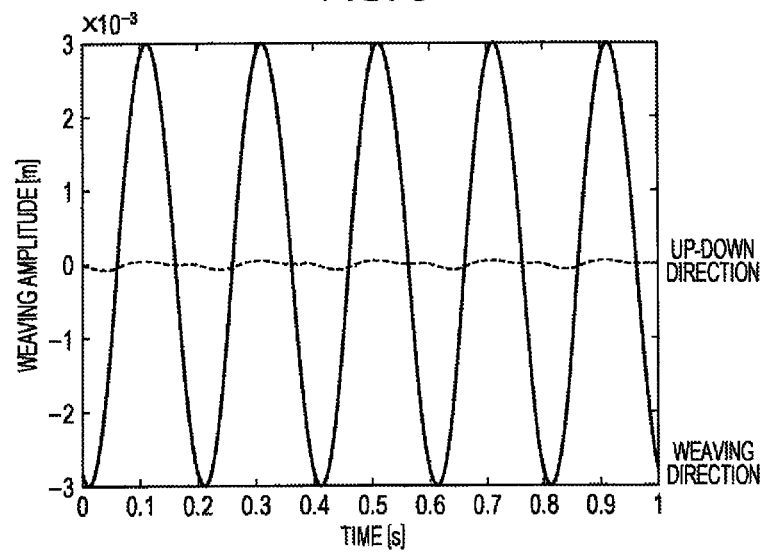
FIG. 8 shows a weaving trajectory of an articulated robot controlled by a trajectory control device (having a dynamic characteristic different from that of FIG. 2) according to a second embodiment of the present invention.

FIG. 8 shows a weaving trajectory when the characteristics of the first dynamic characteristic calculation unit 300 and the second dynamic characteristic calculation unit 400 are given in this way. As shown in FIG. 8, in the weaving trajectory of the trajectory control device of this embodiment, oscillation in the up-down direction is suppressed more than in the weaving trajectory of the first embodiment (FIG. 3).

In the above-described way, in the articulated robot, the trajectory control device of this embodiment can compensate the influence of the coupling torque between the axes and can enable motion, such as weaving, with a higher trajectory accuracy.

Modification of Second Embodiment

Next, a trajectory control device according to a modification of the second embodiment will be described.

As described above, the characteristic of the second dynamic characteristic calculation unit 400 is given as a desired dynamic characteristic (having a considerably strong high-frequency cutoff characteristic). However, when the current control characteristic of a motor-current control part 520 is not negligible, the characteristic of the second dynamic characteristic calculation unit 400 is given as a characteristic obtained by dividing the desired dynamic characteristic by the current control characteristic. This means that, when the current control characteristic of the motor-current control part 520 is considered, the characteristic of the first dynamic characteristic calculation unit 300 is given to correspond to a characteristic obtained by subjecting the characteristic of the second dynamic characteristic calculation unit 400 to division by the feedback control dynamic characteristic and multiplication by the current control characteristic.

In this case, the characteristic of the second dynamic characteristic calculation unit 400 is given by the following Expression (3).

[Math. 3]

$$\text{dynamic characteristic 2} = \text{desired dynamic characteristic/current control characteristic} \quad (3)$$

For this reason, the characteristic of the first dynamic characteristic calculation unit 300 expressed by Expression (2) above is given by the following Expression (4).

[Math. 4]

$$\text{dynamic characteristic 2/servo } FB \text{ control dynamic} \quad (4)$$
$$\text{characteristic} \times \text{current control characteristic} = \text{desired}$$
$$\text{dynamic characteristic} \times \frac{J \cdot s^3 + \text{current control characteristic} \times}{\text{current control characteristic} \times} \frac{(Gv \cdot s^2 + (Gp \cdot Gv + Gi) \cdot s + Gp \cdot Gi)}{(Gp \cdot Gv \cdot s + Gp \cdot Gi)}$$

Figure 9:
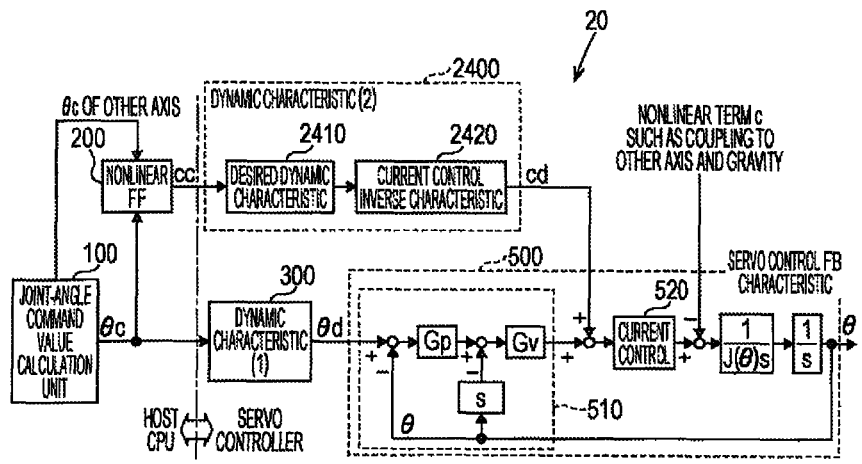
FIG. 9 is a control block diagram of a trajectory control device according to a modification of the second embodiment of the present invention.

FIG. 9 is a control block diagram when a first dynamic characteristic calculation unit 300 and a second dynamic characteristic calculation unit 2400 are given, as described above. As illustrated in FIG. 9, in this trajectory control device 20, the characteristic of the second dynamic characteristic calculation unit 2400, which replaces the second dynamic characteristic calculation unit 400, is a characteristic obtained by multiplying a desired dynamic characteristic 2410 by an inverse characteristic 2420 of the current control characteristic.

In the above-described way, in the articulated robot, the trajectory control device of the modification can enable motion, such as weaving, with a higher trajectory accuracy while considering the current control characteristic of the motor-current control part 520 and compensating the influence of the coupling torque between the axes.

Third Embodiment

A trajectory control device according to a third embodiment of the present invention will be described below. The trajectory control device of this embodiment is different from the above-described trajectory control device 10 of the first embodiment in the way to give a first dynamic characteristic calculation unit 300. Since others are the same as those of the first embodiment, descriptions overlapping with the above descriptions are not repeated here.

Considering that high performance can be obtained even when the gain is approximated by "1" because the current control characteristic makes response at considerably high speed, Expression (1) is transformed into the following Expression (5).

[Math. 5]

$$\frac{Gp \cdot Gv \cdot s + Gp \cdot Gi}{J \cdot s^3 + Gv \cdot s^2 + (Gp \cdot Gv + Gi) \cdot s + Gp \cdot Gi} \quad (5)$$

Expression (2) for giving the first dynamic characteristic calculation unit 300 is transformed into the following Expression (6).

[Math. 6]

$$\text{dynamic characteristic 2/servo } FB \text{ control dynamic characteristic} = \quad (6)$$
$$\text{dynamic characteristic 2} \times \frac{J \cdot s^3 + Gv \cdot s^2 + (Gp \cdot Gv + Gi) \cdot s + Gp \cdot Gi}{Gp \cdot Gv \cdot s + Gp \cdot Gi}$$

This means that the cutoff frequency of a second dynamic characteristic calculation unit 400 is lower than the cutoff frequency of the first dynamic characteristic calculation unit 300 and that the characteristic of the first dynamic characteristic calculation unit 300 is given to correspond to a characteristic obtained by dividing the characteristic of the second dynamic characteristic calculation unit 400 by feedback control dynamic characteristic (servo FB control dynamic characteristic).

In this case, the feedback control dynamic characteristic from a joint-angle target value θc to an actual joint angle θ in a state there is no coupling between the axes is calculated on the basis of parameters including at least one of position feedback gain and velocity feedback gain.

Figure 10:
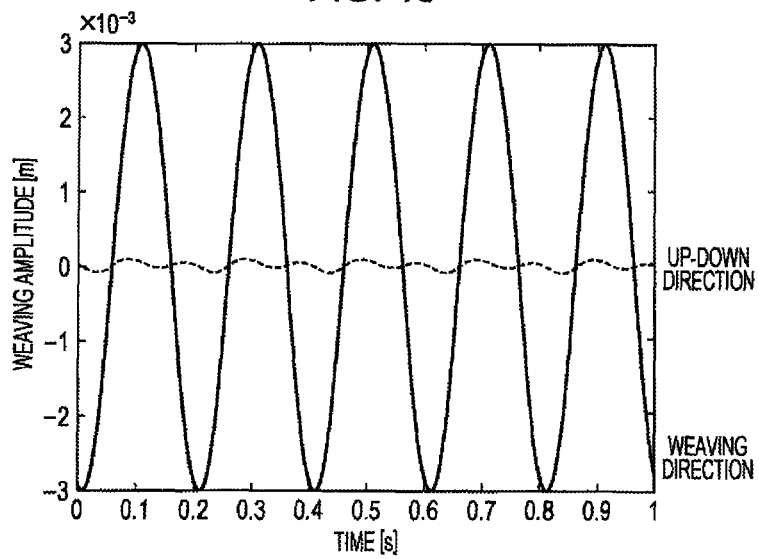
FIG. 10 shows a weaving trajectory of an articulated robot controlled by a trajectory control device (having a dynamic characteristic different from that of FIG. 2) according to a third embodiment of the present invention.

FIG. 10 shows a weaving trajectory when the first dynamic characteristic calculation unit 300 and the second dynamic characteristic calculation unit 400 are given in this way. As shown in FIG. 10, in the trajectory control device of this embodiment, the current control characteristic is approximated by 1. Hence, as a matter of course, performance does not reach the performance of the weaving trajectory (FIG. 8) of the second embodiment. However, it is found that the performance is better than the related art and is sufficiently practical. By thus approximating the current control characteristic by 1, the calculation time can be shortened while satisfying the sufficiently practical performance.

Fourth Embodiment

A trajectory control device according to a fourth embodiment of the present invention will be described below. The trajectory control device of this embodiment is different from the above-described trajectory control device 10 of the first embodiment in the way to give a first dynamic characteristic calculation unit 300. Since others are the same as those of the first embodiment, descriptions overlapping with the above descriptions are not repeated here.

In the trajectory control device of this embodiment, the phase delay of a first dynamic characteristic calculation unit 300 in the axis where the response of a joint-angle control part 510 is slow is shorter than the phase delay of the first dynamic characteristic calculation unit 300 in the axis where the response of the joint-angle control part 510 is fast.

While a desired dynamic characteristic is given for each axis in the above-described second and third embodiments, it is necessary to make the axes have the same dynamic characteristic in an actual weaving motion. For that purpose, the same (common) desired dynamic characteristic is given to all of the axes. In the above-described second and third embodiments (FIGS. 8 and 10), the same desired dynamic characteristic is already given to all of the axes.

Figure 11:
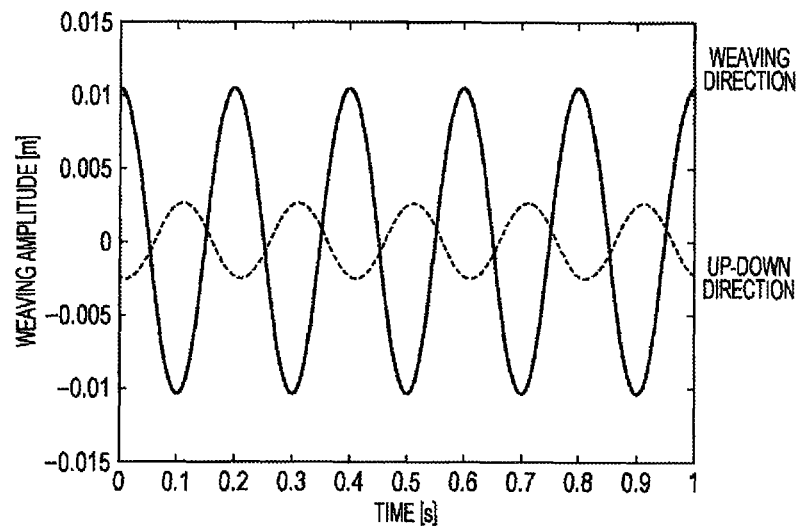
FIG. 11 shows a weaving trajectory of an articulated robot controlled by a trajectory control device (dynamic characteristic is changed among axes) according to a fourth embodiment of the present invention.

FIG. 11 shows a weaving trajectory when the desired dynamic characteristic is slightly changed among the axes. As shown in FIG. 11, when the dynamic characteristic is changed among the axes (the response is made different among the axes), up-down movement occurs. That is, the above-described results of the first to third embodiments (and the related art) are obtained when the response is equal among the axes. When the response is not equal among the axes, weaving accuracy decreases.

In the first to third embodiments, the desired dynamic characteristic is equal among all of the axes. As shown by Expressions (1) and (2), since "dynamic characteristic 1" is multiplied by the inverse characteristic of the servo FB control dynamic characteristic, the response of "dynamic characteristic 1" is faster in the axis where the servo FB control dynamic characteristic is slow than in the axis where the servo FB control dynamic characteristic. Further, the response of "dynamic characteristic 1" is slower in the axis where the servo FB control dynamic characteristic is fast than in the axis where the servo FB control dynamic characteristic is slow.

While the best way is to give "dynamic characteristic 1" by Expressions (1) and (2), the phase characteristic and the gain characteristic from the joint-angle command value θc to the joint angle θ differ among the axes. In the trajectory control device of this embodiment, the state of FIG. 11 can be gradually brought closer to the state of FIG. 3, FIG. 8, or FIG. 9 by making "dynamic characteristic 1" in the axis where the servo FB control dynamic characteristic is fast slower than in the axis where the servo FB control dynamic characteristic is slow.

Fifth Embodiment

A trajectory control device according to a fifth embodiment of the present invention will be described below. The trajectory control device of this embodiment is different in that velocity feedforward control and/or acceleration feedforward control, which is not provided in the above-described trajectory control device 10 of the first embodiment, is added. Since others are the same as those of the first embodiment, descriptions overlapping with the above descriptions are not repeated here.

The trajectory control device of this embodiment is configured such that the characteristic of a first dynamic characteristic calculation unit 300 is changed in accordance with the posture of an articulated robot 1.

In fact, since J(θ) shown in Expression (1) changes in accordance with the posture of the articulated robot 1, the servo control characteristic changes. Therefore, feedforward control in response to the change in posture of the articulated robot 1 can be performed as long as "dynamic characteristic 1" is given by the following Expression (7) in response to the change in J(θ).

[Math. 7]

$$\text{desired dynamic characteristic} \times \frac{J(\theta) \cdot s^3 + \text{current control characteristic} \times}{\text{current control characteristic} \times} \quad (7)$$
$$\frac{(Gv \cdot s^2 + (Gp \cdot Gv + Gi) \cdot s + Gp \cdot Gi)}{Gp \cdot Gv \cdot s + Gp \cdot Gi}$$

The above-described trajectory control devices of the first to fourth embodiments are not provided with velocity feedforward control and/or acceleration feedforward control. However, a trajectory control device 30 of this embodiment is provided with velocity feedforward control and acceleration feedforward control.

Figure 12:
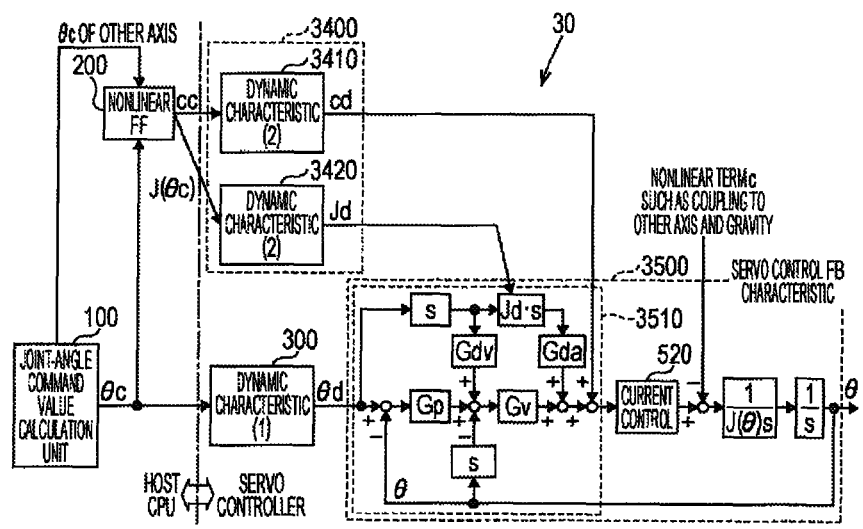
FIG. 12 is a control block diagram of a trajectory control device according to a fifth embodiment of the present invention.

FIG. 12 is a block diagram of the trajectory control device 30 according to the fifth embodiment. The trajectory control device 30 is provided with velocity feedforward control and acceleration feedforward control.

As illustrated in FIG. 12, the trajectory control part 30 includes a joint-angle control part 3510 instead of the joint-angle control part 510, and includes a second dynamic characteristic calculation unit 3400 (a dynamic characteristic calculation part 3410 and a dynamic characteristic calculation part 3420) instead of the second dynamic characteristic calculation unit 400.

In the trajectory control device 30 illustrated in FIG. 12, Expression (1) is given by the following Expression (8).

[Math. 8]

$$\text{current control characteristic} \times \quad (8)$$
$$\frac{(Gda \cdot Jd \cdot s^3 + Gdv \cdot Gv \cdot s^2 + (Gp \cdot Gv + Gdv \cdot Gi) \cdot s + Gp \cdot Gi)}{J(\theta) \cdot s^3 + \text{current control characteristic} \times}$$
$$(Gv \cdot s^2 + (Gp \cdot Gv + Gi) \cdot s + Gp \cdot Gi)$$

According to Expression (8), "dynamic characteristic 1" can be calculated using Expression (2), Expression (4), Expression (6), and Expression (7). Even when the current control characteristic is ignored and is set at 1, performance higher than the related art can be obtained.

Here, Gda and Gdv represent acceleration feedforward gain and velocity feedforward gain, respectively, and each takes a value of 0 to 1. Further, Jd represents the estimated value of J(θ).

As described above, the current control characteristic can also be calculated from current control gain and motor parameters (inductance and resistance).

In the above-described manner, the trajectory control device of this embodiment can compensate the influence of coupling torque between the axes in accordance with the posture of the articulated robot and can make motion, such as weaving, with high trajectory accuracy.

Modification of Fifth Embodiment

Next, a trajectory control device according to a modification of the fifth embodiment will be described.

Figure 13:
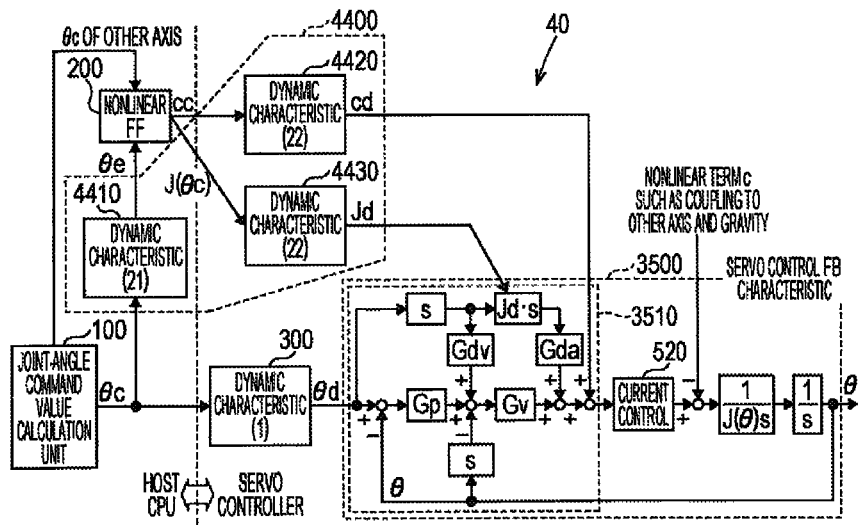
FIG. 13 is a control block diagram of a trajectory control device according to a modification of the fifth embodiment of the present invention.

As shown in FIG. 13, in this modification, second dynamic characteristic calculation units 4400 are disposed before and after a coupling-torque compensation command value calculation unit 200 serving as a nonlinear term. More specifically, a dynamic characteristic (21) calculation part 4410 is disposed before the coupling-torque compensation command value calculation unit 200, and a dynamic characteristic (22) calculation part 4420 and a dynamic characteristic (22) calculation part 4430 are disposed after the coupling-torque compensation command value calculation unit 200.

When the dynamic characteristic (21)×the dynamic characteristics (22) is given to coincide with the above-described dynamic characteristic (2), advantages equal to those of the above embodiments can be obtained. Here, θe represents the output value when a joint-angle command value θc is input to the dynamic characteristic (21) calculation part 4410. A coupling-torque compensation value cd is the value output when a coupling-torque compensation command value cc calculated by the coupling-torque compensation command value calculation unit 200 on the basis of θe is input to the dynamic characteristic (22) calculation part 4420. An inertia compensation value Jd is the value output when an inertial value J(θe) calculated by the coupling-torque compensation command value calculation unit 200 on the basis of θe is input to the dynamic characteristic (22) 4430.

In the above-described manner, in the articulated robot, the trajectory control device of this modification can compensate the influence of the coupling torque between the axes by the separate second dynamic characteristic calculation parts and enable motion, such as weaving, with high trajectory accuracy.

Sixth Embodiment

A trajectory control device according to a sixth embodiment of the present invention will be described below.

Figure 14:
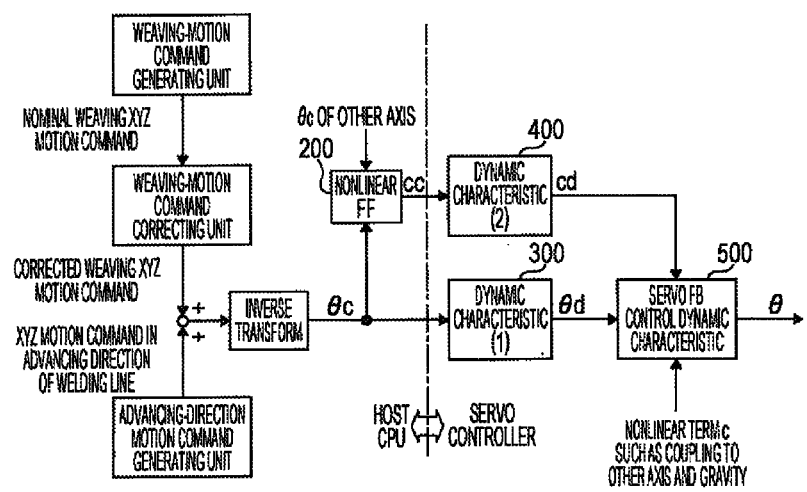
FIG. 14 is a control block diagram of a trajectory control device according to a sixth embodiment of the present invention.
Figure 15:
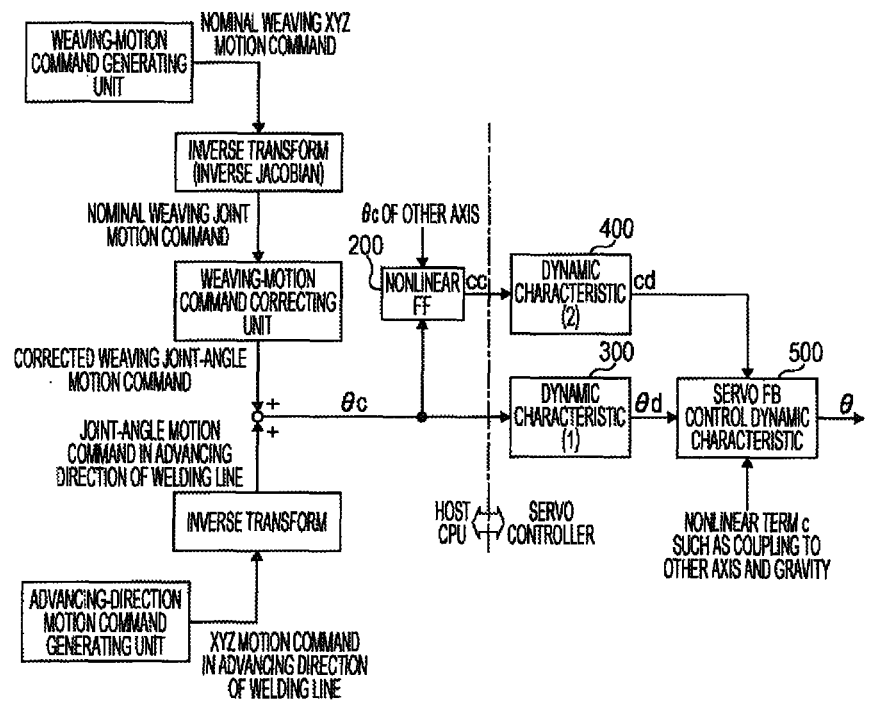
FIG. 15 is another control block diagram of the trajectory control device according to the sixth embodiment of the present invention.

FIGS. 14 and 15 are control block diagrams of the trajectory control device of this embodiment. The control block of FIG. 14 and the control block of FIG. 15 are different in the number and positions of inverse transform (inverse Jacobian) elements.

In this embodiment, since the dynamic characteristic from the target value to the actual value is calculated by "dynamic characteristic 2" (or "desired dynamic characteristic), a gain characteristic and a phase characteristic in the period of a weaving motion can be calculated backward according to the given "dynamic characteristic 2." By correcting a weaving command in accordance with the characteristics, a desired weaving motion can be realized.

Operational Advantages of Embodiments

As in the above-described first to sixth embodiments, that is, the trajectory control device having the following features allows the articulated robot to make motion, such as weaving, with high trajectory accuracy.

(1) The low-pass filter characteristic for cutting the natural oscillation period off the target value is given to remove the oscillation component from the target angle, and the nonlinear compensation torque is subjected to low-pass filtering processing. This makes the nonlinear compensation torque and the target value equal in phase and performs decoupling control while suppressing oscillation.

(2) Even in a state in which there is a phase delay of the servo controller, the characteristic of the low-pass filter for nonlinear compensation is delayed to make the target value and the nonlinear compensation torque equal in phase and to perform decoupling control while suppressing oscillation.

(3) The servo control characteristic differences among the axes are removed by being absorbed by the above-described low-pass filter.

(4) By changing the filter characteristic in accordance with the posture of the robot, the servo control characteristic that changes in accordance with the posture of the robot is absorbed.

(5) While the above-described operations are performed, the weaving amplitude is corrected in each weaving period.

The embodiments disclosed herein are merely examples in all respects, and it should be considered that the embodiments are not restrictive. The scope of the present invention is defined not by the above description but by the scope of the claims, and it is intended to include all modifications within the scope of the claims and the equivalents thereof. The present application is based on Japanese Patent Application (No. 2012-123240) filed on May 30, 2012, the entire contents of which are incorporated herein by reference.

REFERENCE SIGNS LIST

1: articulated robot
10, 20, 30, 40: trajectory control device
100: joint-angle command value calculation unit
200: coupling-torque compensation command value calculation unit (nonlinear FF)
300: first dynamic characteristic calculation unit (dynamic characteristic (1))
400, 2400, 3400, 4400: second dynamic characteristic calculation unit (dynamic characteristic (2))
500: feedback control unit (servo control FB characteristic)
510: joint-angle control part
520: motor-current control part (current control)

The invention claimed is:

1. A trajectory control device for an articulated robot that drives a plurality of joint axes by a motor so that a tool attached to the articulated robot makes a desired motion, the trajectory control device comprising:
    a joint-angle command value calculation unit that calculates and outputs a joint-angle command value θc for each of the joint axes to realize the desired motion of the tool;
    a coupling-torque compensation command value calculation unit that calculates, from the joint-angle command value θc according to a dynamics model, a coupling torque interacting between the joint axes when the motion is made according to the joint-angle command value θc and outputs a coupling-torque compensation command value cc;
    a first dynamic characteristic calculation unit having a high-frequency cutoff characteristic with a cutoff frequency lower than a natural oscillation frequency of the articulated robot, the first dynamic characteristic calculation unit subjecting the joint-angle command value θc to filtering processing, and outputting a processed joint-angle target value θd;
    a joint-angle control unit to which the joint-angle target value θd is input as a target value for the motor;
    a second dynamic characteristic calculation unit having a high-frequency cutoff characteristic with a cutoff frequency lower than or equal to the cutoff frequency of the first dynamic characteristic calculation unit, the second dynamic characteristic calculation unit subjecting at least one of an input to the coupling-torque compensation command value calculation unit and an output from the coupling-torque compensation command value calculation unit to filtering processing, and outputting a processed coupling-torque compensation value cd; and
    a motor-current control unit to which a value obtained by adding the coupling-torque compensation value cd to a motor torque command value output from the joint-angle control unit is input as a target value.

2. The trajectory control device for the articulated robot according to claim 1, wherein a phase delay of the first dynamic characteristic calculation unit in the axis where a response of the joint-angle control unit is slow is shorter than a phase delay of the first dynamic characteristic calculation unit in the axis where a response of the joint-angle control unit is fast.

3. The trajectory control device for the articulated robot according to claim 1, wherein a characteristic of the first dynamic characteristic calculation unit is changed in accordance with a posture of the articulated robot.

4. The trajectory control device for the articulated robot according to claim 2, wherein a characteristic of the first dynamic characteristic calculation unit is changed in accordance with a posture of the articulated robot.

5. The trajectory control device for the articulated robot according to claim 1,
    wherein a feedback control dynamic characteristic from the joint-angle target value θc to an actual joint angle θ in a state in which there is no coupling between the axes is calculated on the basis of a parameter including at least one of a position feedback gain and a velocity feedback gain, and wherein the cutoff frequency of the second dynamic characteristic calculation unit is lower than the cutoff frequency of the first dynamic characteristic calculation unit, and a characteristic of the first dynamic characteristic calculation unit is given to correspond to a characteristic obtained by dividing a characteristic of the second dynamic characteristic calculation unit by the feedback control dynamic characteristic.

6. The trajectory control device for the articulated robot according to claim 5, wherein, when a current control characteristic of the motor-current control unit is considered, the characteristic of the first dynamic characteristic calculation unit is given to correspond to a characteristic obtained by subjecting the characteristic of the second dynamic characteristic calculation unit to division by the feedback control dynamic characteristic and multiplication by the current control characteristic.

7. A trajectory control method for an articulated robot that drives a plurality of joint axes by a motor so that a tool attached to the articulated robot makes a desired motion, the trajectory control method comprising:
   a joint-angle command value calculation step of calculating and outputting a joint-angle command value θc for each of the joint axes to realize the desired motion of the tool;
   a coupling-torque compensation command value calculation step of calculating, from the joint-angle command value θc according to a dynamics model, a coupling torque interacting between the joint axes when the motion is made according to the joint-angle command value θc and outputting a coupling-torque compensation command value cc;
   a first dynamic characteristic calculation step having a high-frequency cutoff characteristic with a cutoff frequency lower than a natural oscillation frequency of the articulated robot, the first dynamic characteristic calculation step subjecting the joint-angle command value θc to filtering process, and outputting a processed joint-angle target value θd;
   a joint-angle control step of receiving the joint-angle target value θd as a target value for the motor;
   a second dynamic characteristic calculation step having a high-frequency cutoff characteristic with a cutoff frequency lower than or equal to the cutoff frequency of the first dynamic characteristic calculation unit, the second dynamic characteristic calculation step subjecting at least one of an input to the coupling-torque compensation command value calculation step and an output from the coupling-torque compensation command value calculation step to filtering processing, and outputting a processed coupling-torque compensation value cd; and
   a motor-current control step of receiving, as a target value, a value obtained by adding the coupling-torque compensation value cd to a motor torque command value output from the joint-angle control step.

* * * * *